A. R. KLINGLOFF.
SELF SETTING PACKING.
APPLICATION FILED APR. 30, 1912.

1,044,787. Patented Nov. 19, 1912.

Witnesses:
C. F. Wesson
W. J. Hartnett

Inventor:
A. R. Klingloff
by Attorneys
Southgate & Southgate.

UNITED STATES PATENT OFFICE.

ANDREW R. KLINGLOFF, OF ROSLINDALE, MASSACHUSETTS.

SELF-SETTING PACKING.

1,044,787.  Specification of Letters Patent.  Patented Nov. 19, 1912.

Application filed April 30, 1912. Serial No. 694,083.

*To all whom it may concern:*

Be it known that I, ANDREW R. KLINGLOFF, a citizen of the United States, residing at Roslindale, in the county of Suffolk and State of Massachusetts, have invented a new and useful Self-Setting Packing, of which the following is a specification.

This invention relates to a packing capable of general use, but particularly adapted for stuffing boxes, and especially useful in cases in which a plunger has a long travel through the stuffing box as in the case of plunger elevators.

The principal objects of the invention are to provide a packing which shall be self-setting, that is, in which the pressure of the water or other fluid on one side of the packing shall force the surface of the packing into intimate contact with the plunger or other reciprocating member in the stuffing box; to provide a construction in which in spite of this action there will be very little friction, particularly when the plunger works in one way, as for example, when it comes down in the case of a hydraulic elevator; and to provide a construction in which small pieces of scrap leather or other packing material can be employed; thus reducing the cost of the entire manufacture of the packing below that ordinarily due to material alone.

Further objects and advantages of the invention will appear hereinafter.

Reference is to be had to the accompanying drawing, in which—

Figure 1:
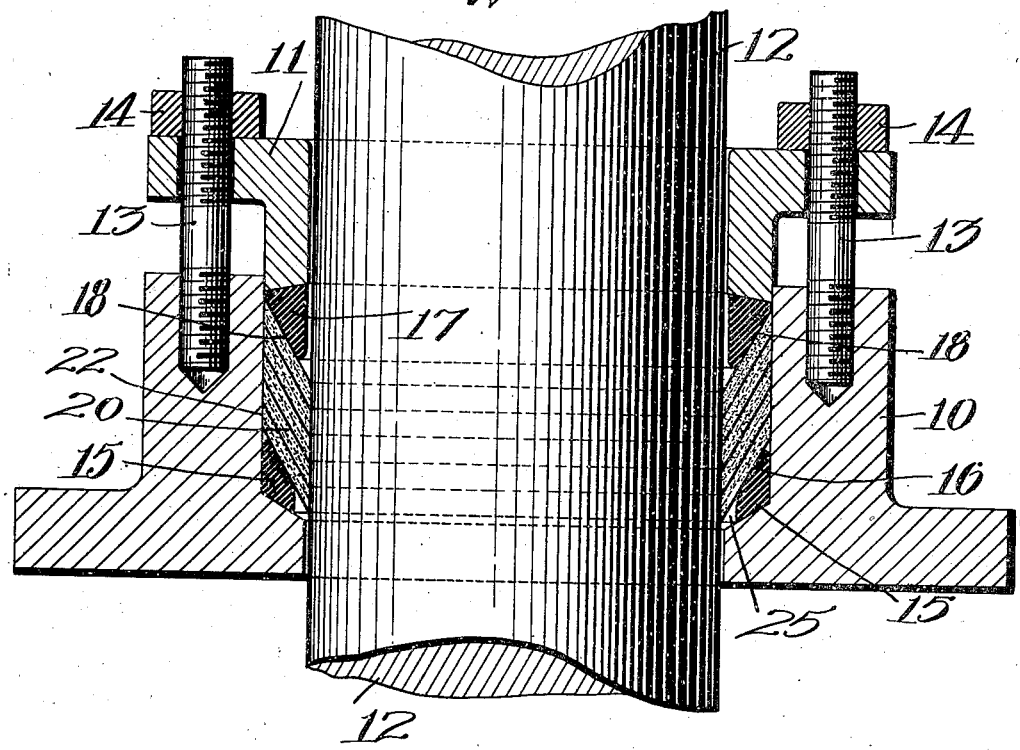
Figure 2:
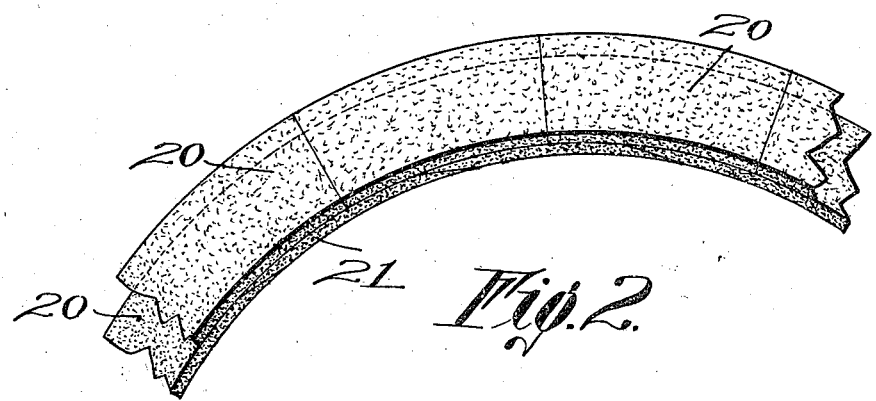

Figure 1 is a longitudinal central sectional view of a stuffing box with a packing constructed in accordance with this invention and applied to the plunger of a hydraulic elevator; and Fig. 2 is a plan of a section of the packing before it is applied.

The invention is shown as applied to a stuffing box 10 having the usual gland 11 for receiving the plunger 12 of a hydraulic elevator. The gland is shown as forced into position by the usual bolts 13 and nuts 14, but any desired kind of stuffing box can be employed. At the inner or bottom end of the stuffing box is located a loose ring 15 of metal and provided with a concave inner surface 16 of conical form. At the inner or bottom end of the gland is another ring 17 provided with a convex outer surface 18 of conical form substantially complementary to the surface 16. This forms an annular space between these two surfaces and the surface of the plunger and box for receiving the packing.

This packing is made up of a plurality of sections like that shown in Fig. 2, each composed of a series of small pieces 20 of scrap sheet material, preferably mineral cured leather, arranged end to end in a plurality of series, each piece being glued at its end to the next piece of the series, and its ends being cut or skived off to fit each other. The joints thus made in each layer are arranged to break joints with those of the next layer. In addition to this each one of these sections is of such shape that when its two ends are brought together and glued it will form a conical piece having an outer convex surface, and an inner concave surface adapted to fit respectively the two surfaces 16 and 18. In addition to this its inner and outer surfaces 21 and 22, when the article is completed, are cylindrical in form.

A plurality of these pieces are placed between the two rings 15 and 17 and being glued together they retain their shape until sufficient pressure is applied to press them against each other and hold them accurately in position. After that if the water dissolves the glue it is immaterial as the particles cannot become loosened or move materially relatively to each other.

In operation the constant pressure of the water upwardly in the space 25 surrounding the plunger causes the inner edge of the packing to press against the plunger, thus forcing the packing automatically into contact with the surface which it is designed to engage. The pressure on the gland obviously forces the upper edges of the packing into contact with the box, and consequently the packing is firmly secured in position at all times and keeps water tight the surfaces against which it comes. This action is practically as efficient after the packing becomes worn because the water pressure from below always acts in the same way. Moreover, the higher the pressure of the water the more firmly is the packing pressed against the surface of the plunger, and consequently the increases in pressure to which this packing is subjected do not result ordinarily in increasing the leakage. It will be seen, also, that while the friction on the plunger is greater when the plunger rises than it is when it descends, it is not excessive at any time and as it descends the friction is very slight indeed.

One of the principal advantages, however, is the fact that small pieces of scrap leather, either mineral tanned, or otherwise, may be employed and thus greatly reduce the cost of the packing, and in fact this brings the entire cost of the packing below the usual cost of the materials for making it under the previous systems.

Although I have illustrated and described a preferred embodiment of the invention, and shown it as applied to a particular mechanism, I am aware of the fact that the invention can be carried out in other ways and applied wherever packings are required. Therefore I do not wish to be limited to all the details of construction herein shown and described, or to the particular application of the invention specified, but What I do claim is:—

The combination with a ring having a concave conical surface and a ring having an opposite convex surface, of a self-setting packing between said rings made up of a plurality of small arcuate pieces of scrap leather arranged in a plurality of concavo-convex series, the pieces of each series being glued together end to end and arranged to break joints with those of another series, and the series being glued together along their contacting concave and convex surfaces.

In testimony whereof I have hereunto set my hand, in the presence of two subscribing witnesses.

ANDREW R. KLINGLOFF.

Witnesses:
N. J. AUG. LANGELL,
LAUCHLIN C. MARTIN.